US012623513B2

(12) United States Patent (10) Patent No.: US 12,623,513 B2
Herolf (45) Date of Patent: May 12, 2026

(54) ADAPTIVE PROTECTIVE GAS FLOW CONTROL IN FREIGHT CONTAINERS

(71) Applicant: ENVIROTAINER ENGINEERING AB, Sollentuna (SE)

(72) Inventor: Anders Herolf, Stockholm (SE)

(73) Assignee: ENVIROTAINER ENGINEERING AB, Sollentuna (SE)

( * ) Notice: Subject to any disclaimer, the term of this patent is extended or adjusted under 35 U.S.C. 154(b) by 397 days.

(21) Appl. No.: 18/029,549

(22) PCT Filed: Sep. 29, 2021

(86) PCT No.: PCT/SE2021/050950
§ 371 (c)(1),
(2) Date: Mar. 30, 2023

(87) PCT Pub. No.: WO2022/071853
PCT Pub. Date: Apr. 7, 2022

(65) Prior Publication Data
US 2023/0331068 A1 Oct. 19, 2023

(30) Foreign Application Priority Data

Oct. 2, 2020 (SE) .................................... 2051159-8

(51) Int. Cl.
B60H 1/32 (2006.01)
B65D 88/74 (2006.01)
(Continued)

(52) U.S. Cl.
CPC ......... B60H 1/3232 (2013.01); B65D 88/745 (2013.01); F24F 11/74 (2018.01); F24F 2009/005 (2013.01)

(58) Field of Classification Search
CPC ... B60H 1/3232; F24F 11/74; F24F 2009/005; B65D 88/745; B60J 9/04; F25D 23/023
See application file for complete search history.

(56) References Cited

U.S. PATENT DOCUMENTS 6,105,377 A 8/2000 Jeong et al.
6,508,076 B1 * 1/2003 Gast ...................... B65D 88/745
62/239
(Continued)

FOREIGN PATENT DOCUMENTS

EP 0346135 A2 12/1989
FR 2983128 A1 * 5/2013 ............. B60H 1/243
(Continued)

OTHER PUBLICATIONS

English translation of FR-2983128-A1, dated Jun. 25, 2025 (Year: 2025).*
(Continued)

*Primary Examiner* — Michael G Hoang
*Assistant Examiner* — Brett P. Mallon
(74) *Attorney, Agent, or Firm* — MOSER TABOADA

(57) ABSTRACT

A method for controlling a climate-conditioned gas-flow in a freight container comprises providing (S2) of a climate-conditioned gas-flow into a cargo compartment defined by a floor, a ceiling and walls, of which one comprises a door. Measurements of climate conditions are obtained (S4) in a gas-flow going into the climate arrangement, going out from the climate arrangement and/or the cargo compartment. The climate-conditioned gas-flow is controlled (S6) based on the measurements of climate conditions. The climate-conditioned gas-flow is provided in vicinity of the ceiling, whereby a part of the climate-conditioned gas-flow reaches the container wall comprising a door. A door position is monitored (S8), detecting whether the door is open or closed. When the door is monitored to be open, the climate-conditioned gas-flow is deviated (S12) as an adaptive protective gas flow over the opening of the open door. A freight container for the method is also disclosed.

7 Claims, 6 Drawing Sheets

(51) Int. Cl.
 *F24F 9/00* (2006.01)
 *F24F 11/74* (2018.01)

(56) References Cited

U.S. PATENT DOCUMENTS

| | | | |
|---|---|---|---|
| 8,702,481 | B1 | 4/2014 | Wilbourn et al. |
| 2004/0003617 | A1 | 1/2004 | Chandler et al. |

FOREIGN PATENT DOCUMENTS

| | | | | |
|---|---|---|---|---|
| JP | 051986 | U | | 1/1993 |
| JP | 05213053 | A | | 8/1993 |
| JP | H05213053 | A | | 8/1993 |
| JP | 1059057 | A | | 3/1998 |
| JP | H1059057 | A | * | 3/1998 |
| JP | H11201618 | A | | 7/1999 |
| JP | 2013113561 | A | | 6/2013 |
| JP | 2014081128 | A | * | 5/2014 |
| WO | WO-2017/147299 | A1 | | 8/2017 |
| WO | WO-2017130014 | A1 | * | 8/2017 ........... B60H 1/3232 |
| WO | WO-2018220904 | A1 | | 12/2018 |

OTHER PUBLICATIONS

English translation of JP-2014081128-A, dated Jun. 25, 2025 (Year: 2025).*

English translation of JP-H1059057-A, dated Jun. 25, 2025 (Year: 2025).*

Extended EP Search Report for Application No. 21876085.8 dated Sep. 9, 2024, 66 pages.

Swedish Search Report for Application No. 2051159-8 dated May 10, 2021.

International Search Report Application No. PCT/SE2021/050950 dated Nov. 29, 2021.

* cited by examiner

ADAPTIVE PROTECTIVE GAS FLOW CONTROL IN FREIGHT CONTAINERS

TECHNICAL FIELD

The present invention relates in general to freight containers and in particular to methods and arrangements for controlling conditioning gas flows in freight containers.

BACKGROUND

A substantial part of goods that today is transported around the world today requires or benefits from having a climate-controlled environment around the goods within the freight containers. Temperature sensitive goods may be destroyed or deteriorated if it is exposed for too high and/or too low temperatures during transportation. Other types of good requires certain humidity levels or gas compositions within the cargo compartment. To provide such transportation conditions, many freight containers are equipped with different kinds of climate-control systems.

One approach is to provide gas or air with the requested properties and distribute this air around or into a cargo compartment of the freight container. With proper insulation of the freight container, this climate-conditioned air-flow will establish the requested climate within the cargo compartment. Such solutions are typically operating most efficiently when the conditions of or around the freight container are constant or changing slowly.

Particular challenges occur when the shell of the freight container is broken, i.e. typically during loading, de-loading and cargo inspection. In case of loading and de-loading of climate-sensitive goods, the freight container is typically placed in a loading/de-loading area where the air volume is climate-controlled in a suitable manner. However, cargo inspections, such as e.g. customs investigations, strapping checking etc., are often to be performed in areas lacking such climate-control facilities. Opening a door to a freight container in an ordinary customs hall will typically introduce possibilities for external gas, e.g. air, to enter into the cargo compartment and disturb the climate-conditioning. Even if the climate-conditioning equipment may be powerful enough to keep the environment in the cargo compartment within permitted condition intervals, the load on the equipment may cause wear or the power consumption to drive the equipment may e.g. discharge batteries unnecessarily much.

SUMMARY

A general object is thus to find method and arrangements that may reduce the impact of an opened freight container door on the cargo compartment climate.

The above object is achieved by methods and devices according to the independent claims. Preferred embodiments are defined in dependent claims.

In general words, in a first aspect, a method for controlling a climate-conditioned gas-flow in a freight container comprises providing of, by a climate arrangement, a climate-conditioned gas-flow into a cargo compartment of the freight container. The cargo compartment is defined by a floor, a ceiling and walls, wherein at least one of the walls comprises a door. Measurements of climate conditions in a gas-flow going into the climate arrangement, a gas-flow going out from the climate arrangement and/or the cargo compartment are obtained. The climate-conditioned gas-flow is provided in vicinity of the ceiling of the cargo compartment. A door position is monitored, detecting whether the door is open or closed. Climate conditions of the climate-conditioned gas-flow is controlled based on the measurements of climate conditions. At least a part of the climate-conditioned gas-flow reaches the container wall comprising a door. When the door is monitored to be open, the at least a part of the climate-conditioned gas-flow is deviated as an adaptive protective gas flow over the opening of the open door. The controlling of climate conditions of the climate-conditioned gas-flow is further based on the door position.

In a second aspect, a freight container comprises a cargo compartment being defined by a floor, a ceiling and walls, wherein at least one of the walls comprises a door. The freight container further comprises a climate arrangement, sensors, a control unit and a door position monitoring device. The climate arrangement is configured for providing a climate-conditioned gas-flow into the cargo compartment of the freight container. The climate-conditioned gas-flow is provided in vicinity of the ceiling of the cargo compartment. The sensors are for obtaining measurements of climate conditions in a gas-flow going into the climate arrangement, a gas-flow going out from the climate arrangement, and/or the cargo compartment. The control unit is configured for controlling climate conditions of the climate-conditioned gas-flow. The door position monitoring device is configured to detect whether the door is open or closed. At least a part of the climate-conditioned gas-flow reaches the container wall comprising a door. The control unit is communicationally connected to the sensors and the climate arrangement, and is configured for controlling climate conditions of the climate-conditioned gas-flow based on the measurements of climate conditions. The door position monitoring device is communicationally connected to the control unit. The freight container further comprises deviating means, arranged for deviating the at least a part of the climate-conditioned gas-flow as an adaptive protective gas flow over the opening of the open door when the door is monitored to be open. The control unit is further configured to control climate conditions of the climate-conditioned gas-flow further based on the door position.

One advantage with the proposed technology is that the adaptive protective gas flow reduces the amount of external gas being able to enter into the cargo compartment when the freight container doors are opened. Other advantages will be appreciated when reading the detailed description.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

In the following, embodiments of air-freight containers are described. However, even though the present ideas are of most benefit for air freight, the same approaches are also operational for other types of freight containers. Thus, in one preferred embodiment, the freight container is an air-freight container.

For a better understanding of the proposed technology, it may be useful to begin with a brief overview of freight container having a climate-conditioned gas-flow.

Figure 1A:
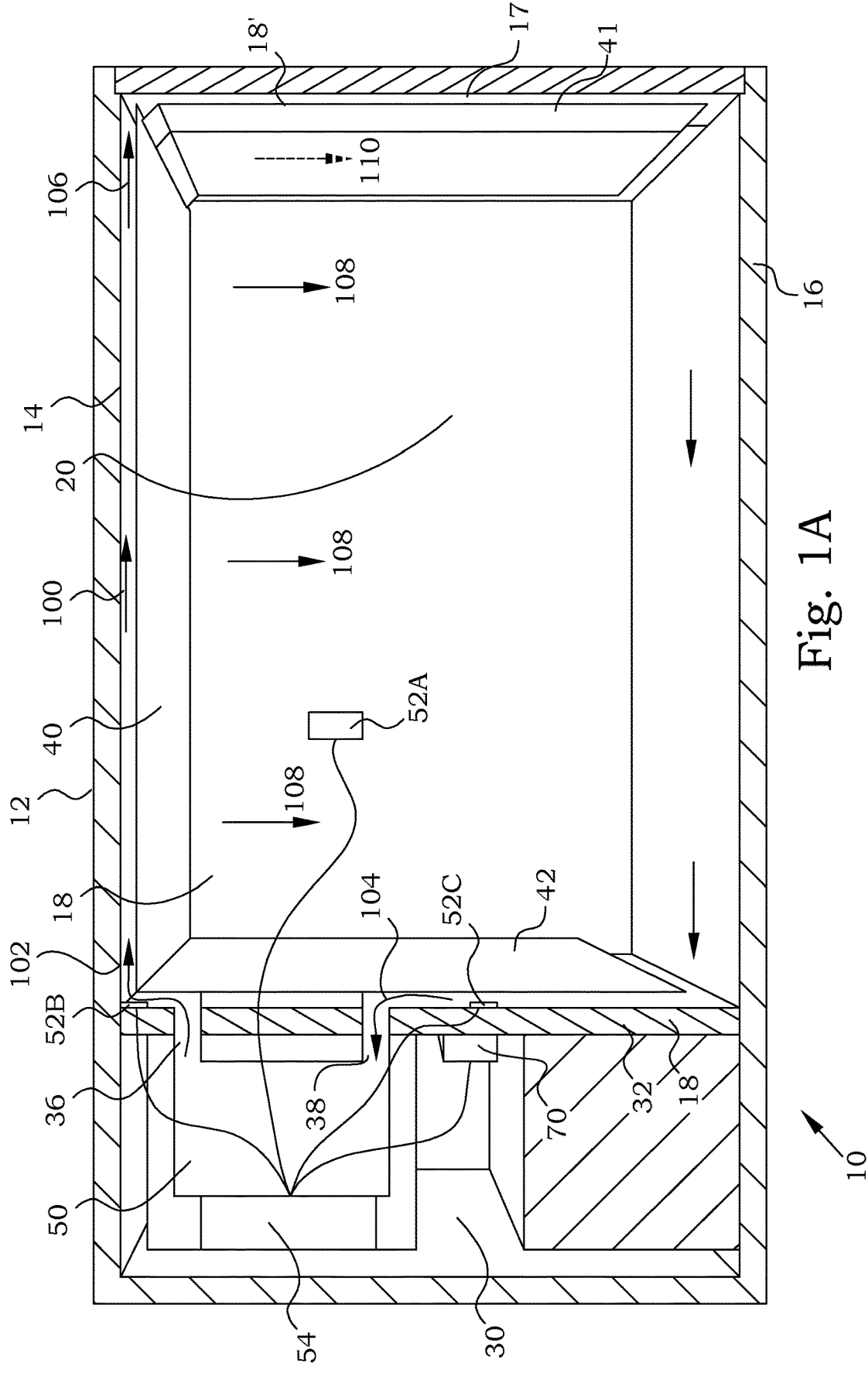
FIG. 1A is a cross-sectional view of an embodiment of a freight container.

FIG. 1A illustrates a cross-sectional view of a freight container 10 having a climate-conditioned gas-flow 100. The freight container 10 is defined by an outer shell 12. A cargo compartment 20 within the outer shell 12 is defined by a floor 16, a ceiling 14 and walls 18, 18'. At least one of the walls 18' comprises a door 17. The freight container 10 also comprises a climate arrangement 50. The climate arrangement 50 is configured for providing a climate-conditioned gas-flow 100 into the cargo compartment 20 of the freight container 10. The climate arrangement 50 is in this embodiment situated in a control compartment 30 that is separated from the cargo compartment 20 by a partition wall 32. The climate arrangement 50 receives a gas-flow 104 going into the climate arrangement 50 through an input pipe 38 and provides a gas-flow 102 going out from the climate arrangement 50 through an output pipe 36. The climate-conditioned gas-flow 100 is provided in vicinity of the ceiling 14 of the cargo compartment 20. At least a part 106 of the climate-conditioned gas-flow 100 reaches the container wall 18' comprising a door 17.

In this particular embodiment, this distribution of the climate-conditioned gas-flow 100 is supported by an upper gas-flow distributer plate 40. The climate-conditioned gas-flow 100 is here directed from the output pipe 36 to the space between the ceiling and the upper gas-flow distributer plate 40. The upper gas-flow distributer plate 40 does not cover all the distance to the walls and leaves openings for climate-conditioned gas to flow 108 into the main cargo compartment. Also at the wall 18' comprising the door 17, there is a slit between the wall 18' and the upper gas-flow distributer plate 40 to allow gas 110 to flow down along the closed door 17. In certain embodiments, like the one illustrated, a door gas-flow collector plate 41 may be provided at the door 17. This door gas-flow collector plate 41 collects most of the gas 110 and directs it along the door 17.

Likewise, there is in this particular embodiment also a side gas-flow collector plate 42, placed with a small distance to the wall separating the cargo compartment 20 from the control compartment 30. Gas leaving the cargo compartment 20 flows beneath the edge of the side gas-flow collector plate 42 and upwards along the wall into the input pipe 38. Gas-flow collector plates may in some embodiments also be provided along the long side walls 18, however, not illustrated here.

The procedures and components used for distributing a gas flow around or within the cargo compartment can be varied in many different ways according to prior art solutions. For the embodiments addressed by the present technology, the common features are that the climate-conditioned gas-flow 100 is provided in vicinity of the ceiling 14 of the cargo compartment 20, and that at least a part 106 of that climate-conditioned gas-flow 100 reaches the upper part of the container wall 18' comprising a door 17.

The freight container 10 furthermore comprises sensors for obtaining measurements of climate conditions. In the illustrated embodiment, there are three sensors. A first sensor 52A is placed in the cargo compartment. A second sensor 52B is placed in the gas-flow 102 going out from the climate arrangement 50. A third sensor 52C is placed in the gas-flow 104 going into the climate arrangement 50. In other embodiments, one or two of these sensors may be provide. The sensors measure climate conditions, typically temperature, pressure, humidity, oxygen level etc.

The sensor or sensors 52A-C are communicationally connected to a control unit 54, which in turn is communicationally connected to the climate arrangement 50. The control unit 54 is configured for controlling climate conditions of the climate-conditioned gas-flow 100 based on the measurements of climate conditions obtained by the sensor or sensors 52A-C. The climate-controlled gas-flow could thereby for instance have a temperature within a predetermined interval, and/or a humidity within a predetermined interval, depending on the requirements set for the cargo to be transported. Other surrounding gas properties, such as pressure, gas compositions etc. may also be controlled. Such a control of the operation of the climate arrangement 50 is well-known, as such, for any person skilled in the art and is therefore not further described in detail. The gas provided from the climate arrangement 50 is typically air. However, in particular cases, e.g. where the intended cargo is sensitive for oxygen, protective gases, such as e.g. nitrogen may be used.

Figure 1B:
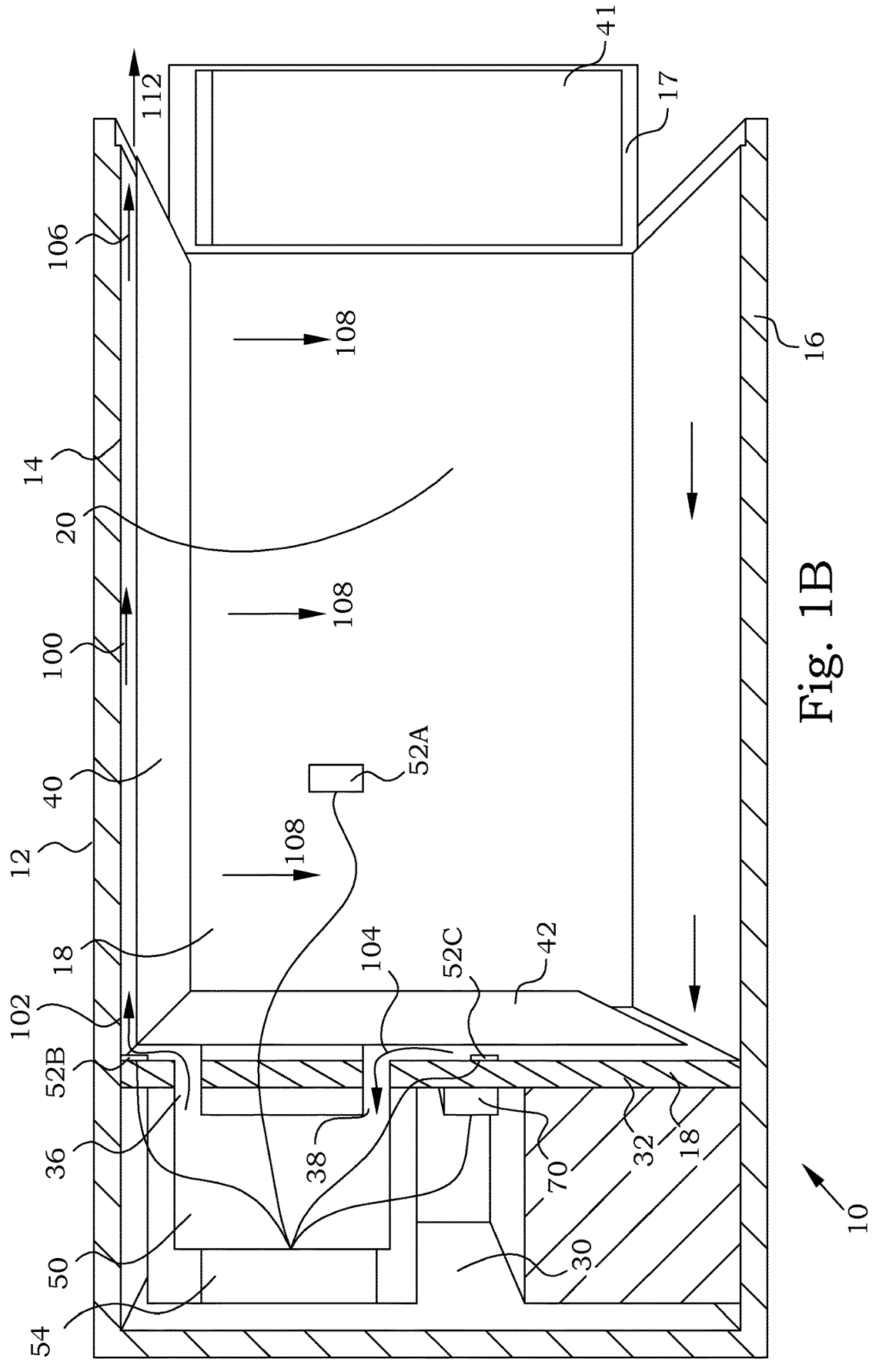
FIG. 1B is a cross-sectional view of the embodiment of a freight container of FIG. 1A, when the doors are open.

FIG. 1B illustrates the freight container 10, when the door 17 is opened. Gas from the surroundings may then enter into the cargo compartment 20 and the door 17 and the door gas-flow collector plate 41 do not assist any more in directing the part 106 of the climate-conditioned gas-flow 100 that reaches the opening and may therefore be provided as a gas flow 112 out from the freight container 10 instead. In order to reduce such an outgoing flow, which in turn increases the ingoing flow of surrounding gases, the operation of the entire climate arrangement 50 may even be reduced.

This type of freight container can be a container for different transportation means, such as air freight, road freight, sea freight etc.

Figure 2A:
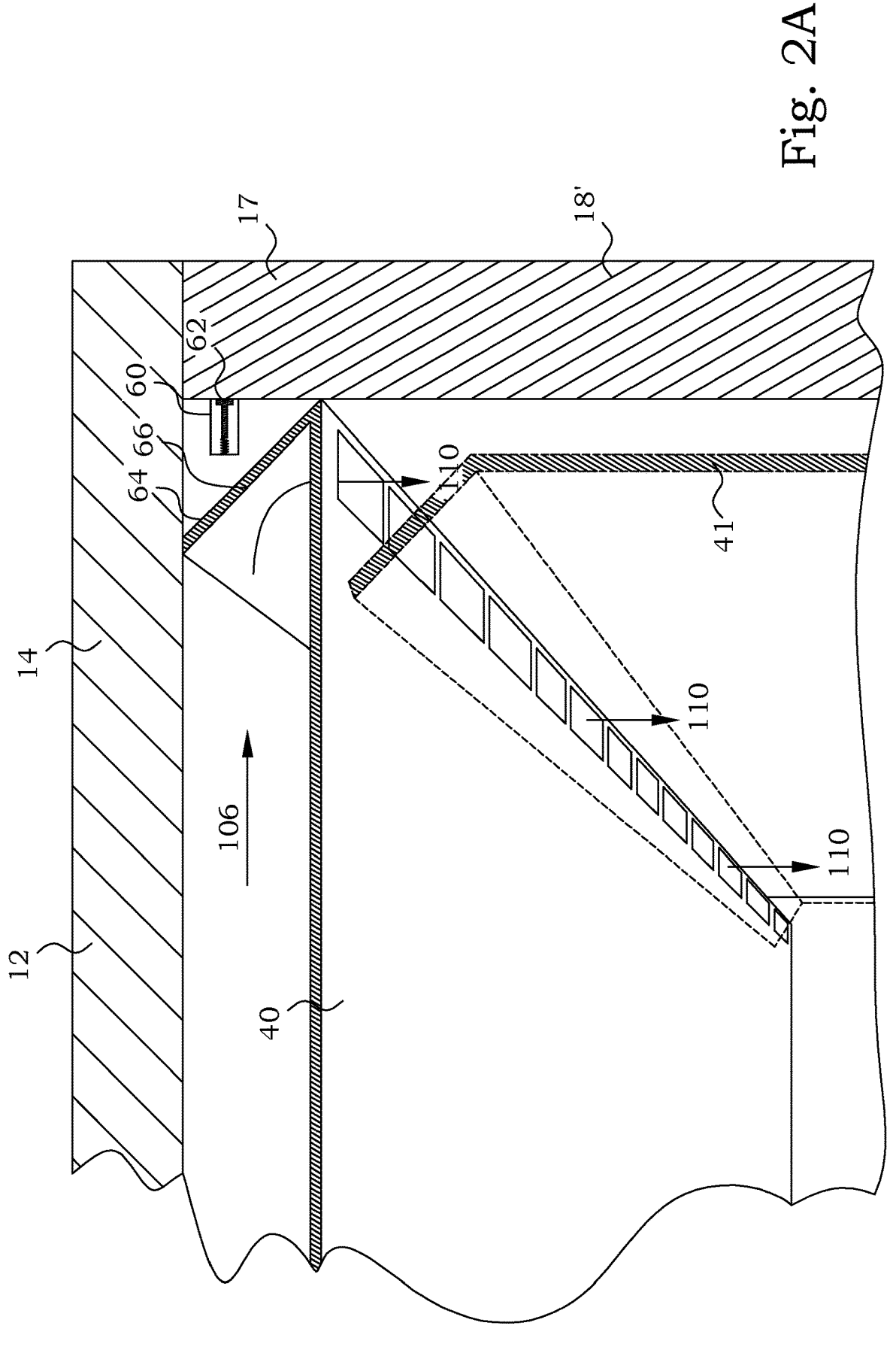
FIG. 2A is a cross-sectional view of a part of an embodiment of a freight container.

FIG. 2A illustrates a part of an embodiment of a freight container 10. The illustration shows the upper corner in the vicinity of the wall 18' comprising a door 17. In this embodiment, the freight container 10 further comprises a door position monitoring device 60. The door position monitoring device 60 is configured to detect whether the door is open or closed. This detection can be achieved in many different ways, using e.g. measurements of mechanical contacts, electrical properties, optical detection, etc. As an example, in the present embodiment, a simple mechanical solution is used. A contact pin 62 is arranged in a resiliently manner in the door position monitoring device 60. This pin will be pushed into the door position monitoring device 60 by the door 17, when the door is closed, and the door position monitoring device 60 may therefore be based on the position of the pin decide whether the door 17 is open or closed. The details of achieving such a detection are well-known, as such, by any person skilled in the art and will not be further discussed. The door position monitoring device 60 is communicationally connected to the control unit 54.

The freight container 10 further comprises deviating means 64. In this particular embodiment, the deviating means 64 is constituted by an angled plate 66 arranged between the ceiling and the upper gas-flow distributer plate 40. The deviating means 64 is arranged for deviating the at least a part of the climate-conditioned gas-flow 106, reaching the edge of the ceiling in the vicinity of the door 17. When the door 17 is closed, this action will only facilitate one of the functions that the door 17 has when being closed, i.e. turning the gas-flow 110 down along the closed door 17.

Figure 2B:
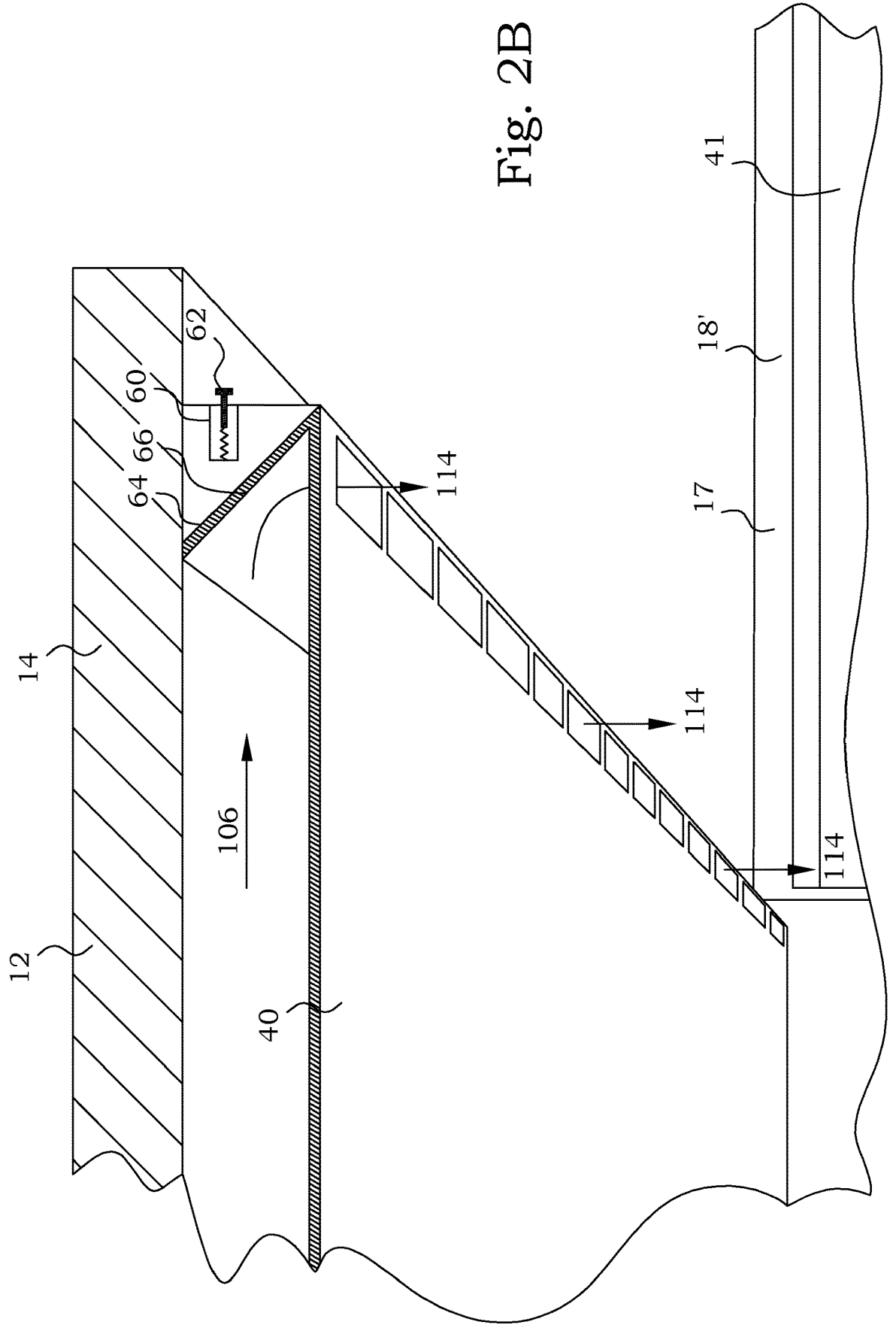
FIG. 2B is a cross-sectional view of a part of the embodiment of a freight container of FIG. 2A, when the doors are open.

FIG. 2B illustrates the same freight container as in FIG. 2A, but when the door 17 is opened. It can here be noted that the contact pin 62 no longer is in contact with the door and is consequently protruding out from the door position monitoring device 60, whereby the door position monitoring device 60 can conclude that the door 17 is open. In this view, the important role of the deviating means 64 can be seen. Since the door 17 is absent, the door 17 will not be able to assist in maintaining any gas-flow downwards along the door 17. Instead, it is solely the deviating means 64 that maintain this action. The deviated gas-flow 110 will here act as an adaptive protective gas flow 114 over the opening of the open door when the door 17 is monitored to be open.

The deviating means 64 can, as in the illustrated embodiment, be in deviating action both when the door is open and closed. Alternatively, the deviating means 64 can be arranged to be put in place for action only when the door is open. This can be determined by different kinds of deigns choices, e.g. depending on the requested exact position of the adaptive protective gas flow. However, such modifications are easily performed by any person skilled in the art.

The above principles can be utilized in all types of freight containers 10. However, the benefits are particularly prominent in freight containers 10 relying on battery powering of the climate arrangement 50. This is often the case, e.g. for air freight containers. Therefore, in one embodiment, the freight container 10 is an air freight container.

Figure 3:
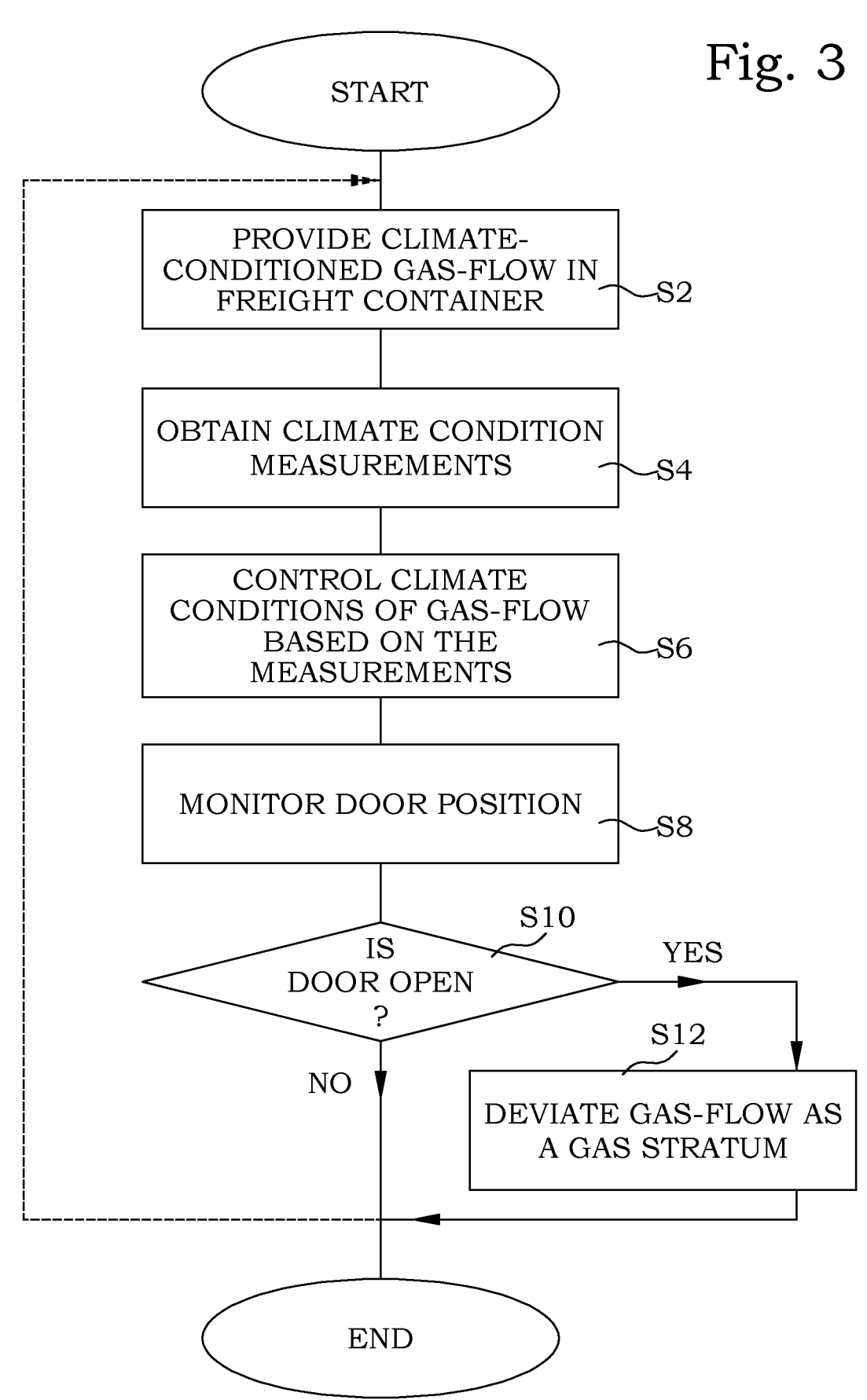
FIG. 3 is a flow diagram of steps of an embodiment of a method for controlling a climate-conditioned gas-flow in a freight container.

FIG. 3 is a flow diagram of steps of a method for controlling a climate-conditioned gas-flow in a freight container. In step S2, a climate-conditioned gas-flow is provided by a climate arrangement into a cargo compartment of the freight container. The cargo compartment is defined by a floor, a ceiling and walls. At least one of the walls comprises a door. In step S4, measurements of climate conditions in a gas-flow going into the climate arrangement, a gas-flow going out from the climate arrangement and/or the cargo compartment are obtained. In step S6 climate conditions of the climate-conditioned gas-flow are controlled based on the measurements of climate conditions. The climate-conditioned gas-flow is provided in vicinity of the ceiling of the cargo compartment, whereby at least a part of the climate-conditioned gas-flow reaches the container wall comprising a door. In step S8, a door position is monitored, detecting whether the door is open or closed. In step S10, it is concluded whether the door is open. If the door is monitored to be open, the procedure continues to step S12, where the at least a part of the climate-conditioned gas-flow is deviated as an adaptive protective gas flow over the opening of the open door.

The deviation of the already provided gas flow is a first level measure for mitigating surrounding gas to enter into an opened freight container. However, in preferred embodiment, also the control of the climate-conditioned gas-flow can be influenced in order to further improve this action.

In other words, the controlling of climate conditions of the climate-conditioned gas-flow is in preferred embodiments further based on the door position.

In one embodiment, the controlling of climate conditions of the climate-conditioned gas-flow comprises increasing a flow rate of the climate-conditioned gas-flow when the door is opened. This increases the strength of the adaptive protective gas flow and improves its ability to prevent surrounding gas to enter into the freight container. Since the result of surrounding air entering the freight container typically increases the requested action of the climate control, such an increase in gas-flow may contribute to such an increased action before the ordinary control based on the climate condition measurements reacts to changed conditions. This advance-operated flow-increase may therefore reduce the fluctuations of climate properties in the freight container in many cases.

After some time of open doors, the ordinary control mechanisms for the climate-controlled gas-flow are typically adapted to the new conditions. The enforcement of gas-flow may therefore be unnecessary. In some cases, where the impact of the entering surrounding gas on the climate conditions of the cargo compartment is low, the enforced gas-flow may even be higher than required. Therefore, in one embodiment, the controlling of climate conditions of the climate-conditioned gas-flow returns to an operation mode for closed-door conditions a predetermined time after the door has been opened, even if the door remains open.

These actions are preferably performed by the control unit. Therefore, in one embodiment, the control unit is further configured to control climate conditions of the climate-conditioned gas-flow further based on the door position.

In one embodiment, the control unit is further configured to increase a flow rate of the climate-conditioned gas-flow when the door is opened.

In one embodiment, the control unit is further configured to return to an operation mode for closed-door conditions a predetermined time after the door has been opened, even if the door remains open.

The surrounding conditions are of course of importance for the situation upon opening the freight container doors. If a requested cargo compartment temperature is set to the interval of 15-20° C. and the temperature outside the freight container is 20° C., there is probably a very low change in requested climate control even when the doors are open. However, if the surrounding air has a temperature of 35° C., the situation is completely different. Furthermore, if the surrounding air temperature is 5° C., the requested climate control will also be different, but also different from the case of a hot surrounding temperature.

To this end, in preferred embodiments, the freight container further comprises an ambient thermometer. This ambient thermometer is configured for measuring an ambient temperature, external to the cargo compartment. This ambient thermometer can be provided in different places, e.g. at the outer surface of the container, preferably recessed into the outer surface to avoid mechanical damages. The ambient thermometer may also be provided in other compartments within the freight container that are not subject to the climate control. In FIGS. 1A and 1B, a thermometer 70 is provided in the control compartment 30. The control compartment 30 is typically well ventilated and the temperature inside the control compartment 30 will in most cases be relatively close to the surrounding temperature. The thermometer 70 can therefore be utilized as an ambient thermometer.

The ambient thermometer 70 is communicatively connected to the control unit 54. The control unit 54 is accordingly further configured to control climate conditions of the climate-conditioned gas-flow based on a combination of the ambient temperature and the door position.

In other words, in one embodiment, the method for controlling a climate-conditioned gas-flow in a freight container comprises the further step of measuring an ambient temperature, external to the cargo compartment. The step of controlling climate conditions of the climate-conditioned gas-flow is thereby based on a combination of the ambient temperature and the door position.

The knowledge of an external temperature becomes additionally useful if also the internal temperature is known. In cases the temperature is an object for the climate control, such information is readily available. Otherwise, additional internal thermometers have to be provided for. In other words, in one embodiment, the obtaining of measurements of climate conditions preferably comprises obtaining of an internal temperature of the cargo compartment.

A temperature difference can now be obtained, which may be further used for control purposes. First, consider the case that the ambient temperature is equal or higher than the internal temperature. The difference between the ambient temperature and the internal temperature is then a positive value. If the difference between the ambient temperature and the internal temperature is small, the additional effect of an increased flow rate may be neglectable and the only result will be an increased power consumption. Therefore, in such situations, it may be selected not to increase the flow rate.

However, if a difference between the ambient temperature and the internal temperature of the cargo compartment exceeds a first predetermined level, action may be preferred. In one embodiment, under such conditions, the step of controlling climate conditions of the climate-conditioned gas-flow in turn comprises the step of increasing a flow rate of the climate-conditioned gas-flow by a first predetermined amount as a response to the door being opened.

For very hot surroundings, more powerful actions may be required. In one embodiment, the step of controlling climate conditions of the climate-conditioned gas-flow in turn comprises the step of increasing a flow rate of the climate-conditioned gas-flow by a second predetermined amount, higher than the first predetermined amount, as a response to the door being opened, when a difference between the ambient temperature and the internal temperature of the cargo compartment exceeds a second predetermined level, higher than the first predetermined level.

This approach can of course be developed into more than two levels.

The action of increasing the flow rate can be performed in different ways, depending on the design of the climate arrangement. In some freight containers, the climate arrangement may comprise a number of cooling units, which can be operated one at a time and/or simultaneously. If simultaneous operation is possible, the flow rate can be adapted by changing the number of active cooling units. Therefore, in one embodiment, the step of increasing a flow rate of the climate-conditioned gas-flow by a first predetermined amount and the step of increasing a flow rate of the climate-conditioned gas-flow by a second predetermined amount comprise starting of at least one additional cooling unit.

The situation is similar if the ambient temperature is lower than the internal temperature. The difference between the ambient temperature and the internal temperature is then a negative value, i.e. the difference between the internal temperature and the ambient temperature is then a positive value. Also here, predetermined thresholds may be used. The levels of these thresholds may be in analogy with the hot surrounding cases described above, but may also be set differently.

In one embodiment, the step of controlling climate conditions of the climate-conditioned gas-flow in turn comprises the step of increasing a flow rate of the climate-conditioned gas-flow by a third predetermined amount as a response to the door being opened, when a difference between the internal temperature of the cargo compartment and the ambient temperature exceeds a third predetermined level.

In one embodiment, the step of controlling climate conditions of the climate-conditioned gas-flow in turn comprises the step of increasing a flow rate of the climate-conditioned gas-flow by a fourth predetermined amount, higher than the third predetermined amount, as a response to the door being opened, when a difference between the internal temperature of the cargo compartment and the ambient temperature exceeds a fourth predetermined level, higher than the third predetermined level.

This approach can of course be developed into more than two levels.

In some freight containers, the climate arrangement may comprise a number of heating units, which can be operated one at a time and/or simultaneously. If simultaneous operation is possible, the flow rate can be adapted by changing the number of active heating units. Therefore, in one embodiment, the step of increasing a flow rate of the climate-conditioned gas-flow by a third predetermined amount and the step of increasing a flow rate of the climate-conditioned gas-flow by a fourth predetermined amount comprise starting of additional heating equipment.

Figure 4:
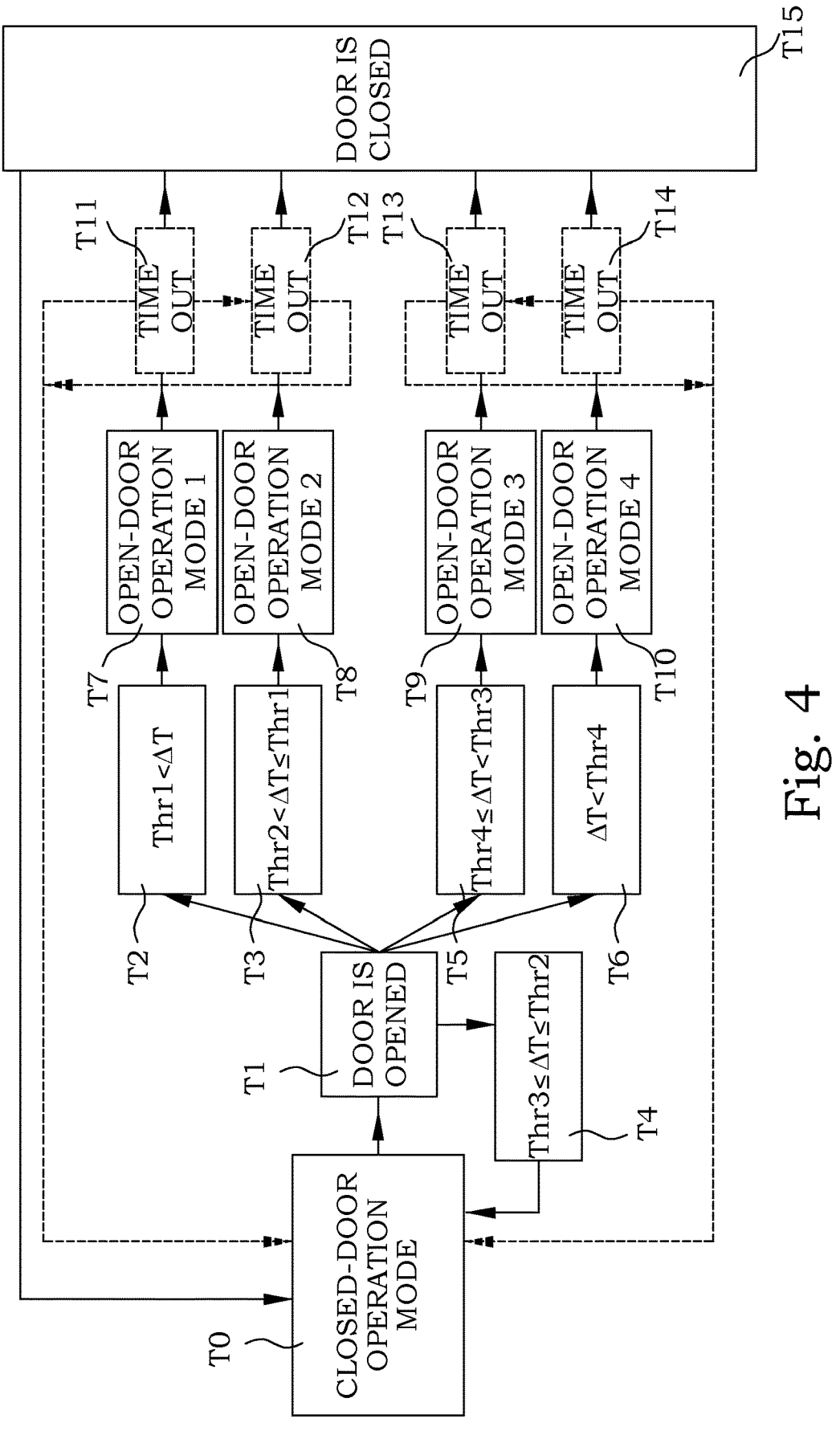
FIG. 4 is an illustration of an embodiment of a logic scheme for flow rate adaption.

One embodiment of a logic scheme for flow rate adaption is illustrated in FIG. 4. A closed-door operation mode T0 is used during normal closed-door conditions. When the door is opened T1, a difference $\Delta T$ between ambient temperature and internal temperature is determined. If this difference is larger, as in T2, than a first threshold Thr1, a first open door operation mode T7 is started, typically involving a high increase in flow rate of cooled gas. If the difference $\Delta T$, as in T3, is equal or lower than the first threshold Thr1, but higher than a second threshold Thr2, a first open door operation mode T8 is started, typically involving an increase in flow rate of cooled gas. If the difference $\Delta T$, as in T4, is equal or lower than the second threshold Thr2, but higher than or equal to a third threshold Thr3, the control returns to the closed-door operation mode T0. The interval between Thr2 and Thr3 involves 0, i.e. when the ambient temperature is equal to the internal temperature. If the difference $\Delta T$, as in T5, is than the third threshold Thr3, but equal to or higher than a fourth threshold Thr4, a third open door operation mode T9 is started, typically involving an increase in flow rate of heated gas. If the difference $\Delta T$ is smaller, as in T6, than the fourth threshold Thr4, a fourth open door operation mode T10 is started, typically involving a high increase in flow rate of heated gas.

Optionally, one or several of the open-door operation modes T7-T10 may involve a time out function T11-T14. In such cases, if a time-out time has expired, the operation changes. The operation mode T7 may be transferred into the less aggressive operation mode T8 or may return to the closed-door operation mode T0. The operation mode T10 may likewise be transferred into the less aggressive operation mode T9 or may return to the closed-door operation mode T0. The operation modes T8 and T9 may after an expired time-out return to the closed-door operation mode T0.

When the door is closed again, as in T15, the operation returns to the closed-door operation mode T0.

In other words, in one embodiment, the step of controlling climate conditions of the climate-conditioned gas-flow returns to an operation mode for closed-door conditions the door closes.

The person skilled in the art easily realizes that the number of different open-door operation modes may be varied and that the temperature thresholds can be adapted in different ways depending on the requests for the cargo in the cargo compartment.

These actions described above are preferably performed by the control unit. Thus, in one embodiment of a freight container, the sensors for obtaining measurements of climate conditions comprises internal thermometers configured for obtaining of an internal temperature of the cargo compartment.

In one embodiment, the control unit is further configured to increase a flow rate of the climate-conditioned gas-flow by a first predetermined amount as a response to the door being opened, when a difference between the ambient temperature and the internal temperature of the cargo compartment exceeds a first predetermined level.

In one further embodiment, the control unit is further configured to increase a flow rate of the climate-conditioned gas-flow by a second predetermined amount, higher than the first predetermined amount, as a response to the door being opened, when a difference between the ambient temperature and the internal temperature of the cargo compartment exceeds a second predetermined level, higher than the first predetermined level.

In one embodiment, the climate arrangement comprises a plurality of cooling units, whereby the control unit is further configured to start at least one additional cooling unit for providing the increasing of a flow rate of the climate-conditioned gas-flow by a first predetermined amount and the increasing of a flow rate of the climate-conditioned gas-flow by a second predetermined amount comprise starting of additional cooling unit.

In one embodiment, the control unit is further configured to increase a flow rate of the climate-conditioned gas-flow by a third predetermined amount as a response to the door being opened, when a difference between the internal temperature of the cargo compartment and the ambient temperature exceeds a third predetermined level.

In one further embodiment, the control unit is further configured to a flow rate of the climate-conditioned gas-flow by a fourth predetermined amount, higher than the third predetermined amount, as a response to the door being opened, when a difference between the internal temperature of the cargo compartment and the ambient temperature exceeds a fourth predetermined level, higher than the third predetermined level.

In one embodiment, the climate arrangement comprises a plurality of heating units, whereby the control unit is further configured to start at least one additional heating unit for providing the increasing of a flow rate of the climate-conditioned gas-flow by a third predetermined amount and the increasing of a flow rate of the climate-conditioned gas-flow by a fourth predetermined amount comprise starting of additional heating equipment.

In one embodiment, the control unit is further configured to return to an operation mode for closed-door conditions the door closes.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A freight container, comprising:
a cargo compartment being defined by a floor, a ceiling and walls, wherein at least one of the walls comprises a door;
a climate arrangement, configured for providing a climate-conditioned gas-flow into said cargo compartment of said freight container,
wherein said climate-conditioned gas-flow is provided in vicinity of said ceiling of said cargo compartment directly from an output pipe of said climate arrangement at a wall opposite to said wall comprising a door, into a space between an upper gas-flow distributer plate and said ceiling, wherein said upper gas-flow distributer plate extends to said wall comprising a door, wherein at least a part of said climate-conditioned gas-flow reaches said container wall comprising a door, wherein upper gas-flow distributer plate constitutes a plane upper limitation of the cargo compartment;
sensors for obtaining measurements of climate conditions in at least one of a gas-flow going into said climate arrangement, a gas-flow going out from said climate arrangement and said cargo compartment,
wherein said sensors for obtaining measurements of climate conditions comprises internal thermometers configured for obtaining of an internal temperature of said cargo compartment;
a control unit configured for controlling climate conditions of said climate-conditioned gas-flow;
a door position monitoring device, configured to detect whether said door is open or closed,
wherein, when said door is closed, said at least a part of said climate-conditioned gas-flow reaching said container wall comprising a door is allowed to flow down along the closed door through openings in said upper gas-flow distributer plate,
wherein said control unit being communicationally connected to said sensors and said climate arrangement,
wherein said door position monitoring device being communicationally connected to said control unit; and by further comprising:
deviating means, arranged for deviating said at least a part of said climate-conditioned gas-flow as an adaptive protective gas flow over the opening of said open door when said door is monitored to be open; and
ambient thermometer, configured for measuring an ambient temperature, external to said cargo compartment,
said ambient thermometer being communicationally connected to said control unit,
whereby said control unit is further configured to control climate conditions of said climate-conditioned gas-flow flowing between said upper gas-flow distributer plate and said ceiling based on a combination of said ambient temperature and said door position,
wherein said control unit is further configured to increase a flow rate of said climate-conditioned gas-flow by a first predetermined amount as a response to said door being opened, when a difference between said ambient temperature and said internal temperature of said cargo compartment exceeds a first predetermined level.

2. The freight container according to claim 1, wherein said control unit is further configured to return to an operation mode for closed-door conditions a predetermined time after said door has been opened, even if said door remains open.

3. The freight container according to claim 1, wherein said control unit is further configured to increase a flow rate of said climate-conditioned gas-flow by a second predetermined amount, higher than said first predetermined amount, as a response to said door being opened, when a difference between said ambient temperature and said internal temperature of said cargo compartment exceeds a second predetermined level, higher than said first predetermined level.

4. The freight container according to claim 1, wherein said climate arrangement comprises a plurality of cooling units, wherein at least two cooling units of said plurality of cooling units are controlled by said control unit to operate together to provide said climate-conditioned gas-flow, whereby said control unit is further configured to start at least one additional cooling unit of said plurality of cooling units for providing said increasing of a flow rate of said climate-conditioned gas-flow by a first predetermined amount.

5. The freight container according to claim 3, wherein said climate arrangement comprises a plurality of cooling units, whereby said control unit is further configured to start at least one additional cooling unit for providing said increasing of a flow rate of said climate-conditioned gas-flow by a first predetermined amount and said increasing of a flow rate of said climate-conditioned gas-flow by a second predetermined amount.

6. The freight container according to claim 3, wherein said control unit is further configured to increase a flow rate of said climate-conditioned gas-flow by a third predetermined amount as a response to said door being opened, when a difference between said internal temperature of said cargo compartment and said ambient temperature exceeds a third predetermined level.

7. The freight container according to claim 6, wherein said control unit is further configured to increase a flow rate of said climate-conditioned gas-flow by a fourth predetermined amount, higher than said third predetermined amount, as a response to said door being opened, when a difference between said internal temperature of said cargo compartment and said ambient temperature exceeds a fourth predetermined level, higher than said third predetermined level.

* * * * *